US012501338B2

United States Patent
Iskander et al.

(10) Patent No.: US 12,501,338 B2
(45) Date of Patent: Dec. 16, 2025

(54) 5G NEW RADIO MOBILITY ENHANCEMENTS

(71) Applicant: Apple Inc., Cupertino, CA (US)

(72) Inventors: Shadi Iskander, Ergolding (DE); Tamer Adel Darweesh Hassan Darweesh, Munich (DE)

(73) Assignee: Apple Inc., Cupertino, CA (US)

( * ) Notice: Subject to any disclaimer, the term of this patent is extended or adjusted under 35 U.S.C. 154(b) by 378 days.

(21) Appl. No.: 18/173,307

(22) Filed: Feb. 23, 2023

(65) Prior Publication Data

US 2023/0269649 A1 Aug. 24, 2023

Related U.S. Application Data

(60) Provisional application No. 63/268,413, filed on Feb. 23, 2022.

(51) Int. Cl.
*H04W 36/24* (2009.01)
*H04W 24/08* (2009.01)
*H04W 36/00* (2009.01)

(52) U.S. Cl.
CPC ........... *H04W 36/24* (2013.01); *H04W 24/08* (2013.01); *H04W 36/0061* (2013.01); *H04W 36/0085* (2018.08)

(58) Field of Classification Search
CPC . H04W 36/24; H04W 24/08; H04W 36/0061; H04W 36/0085; H04W 36/0058; H04W 36/0094
See application file for complete search history.

(56) References Cited

U.S. PATENT DOCUMENTS

| | | | |
|---|---|---|---|
| 2013/0029666 A1* | 1/2013 | Jung | H04W 36/0085 455/436 |
| 2015/0195720 A1 | 7/2015 | Ekici | |
| 2015/0327286 A1* | 11/2015 | Yiu | H04W 72/27 370/328 |
| 2020/0029262 A1* | 1/2020 | Kim | H04W 36/0085 |
| 2020/0275340 A1 | 8/2020 | Kim et al. | |

FOREIGN PATENT DOCUMENTS

EP 3 454 602 3/2019

OTHER PUBLICATIONS

Mostafa, Ahmed Elhamy, and Yasser Gadallah. "A statistical priority-based scheduling metric for M2M communications in LTE networks." IEEE Access 5 (2017): 8106-8117. (Year: 2017).*

* cited by examiner

*Primary Examiner* — Sharad Rampuria
(74) *Attorney, Agent, or Firm* — Fay Kaplun & Marcin, LLP

(57) ABSTRACT

A user equipment (UE) is configured to receive an inter-frequency measurement configuration comprising a plurality of frequencies, wherein neighbor cells transmit at at least one of the frequencies, the inter-frequency measurement configuration further comprising a priority associated with each of the frequencies, performing the frequency measurements of the neighbor cells according to the inter-frequency measurement configuration and reporting inter-frequency measurement results of the neighbor cells according to the priority in the inter-frequency measurement configuration.

14 Claims, 7 Drawing Sheets

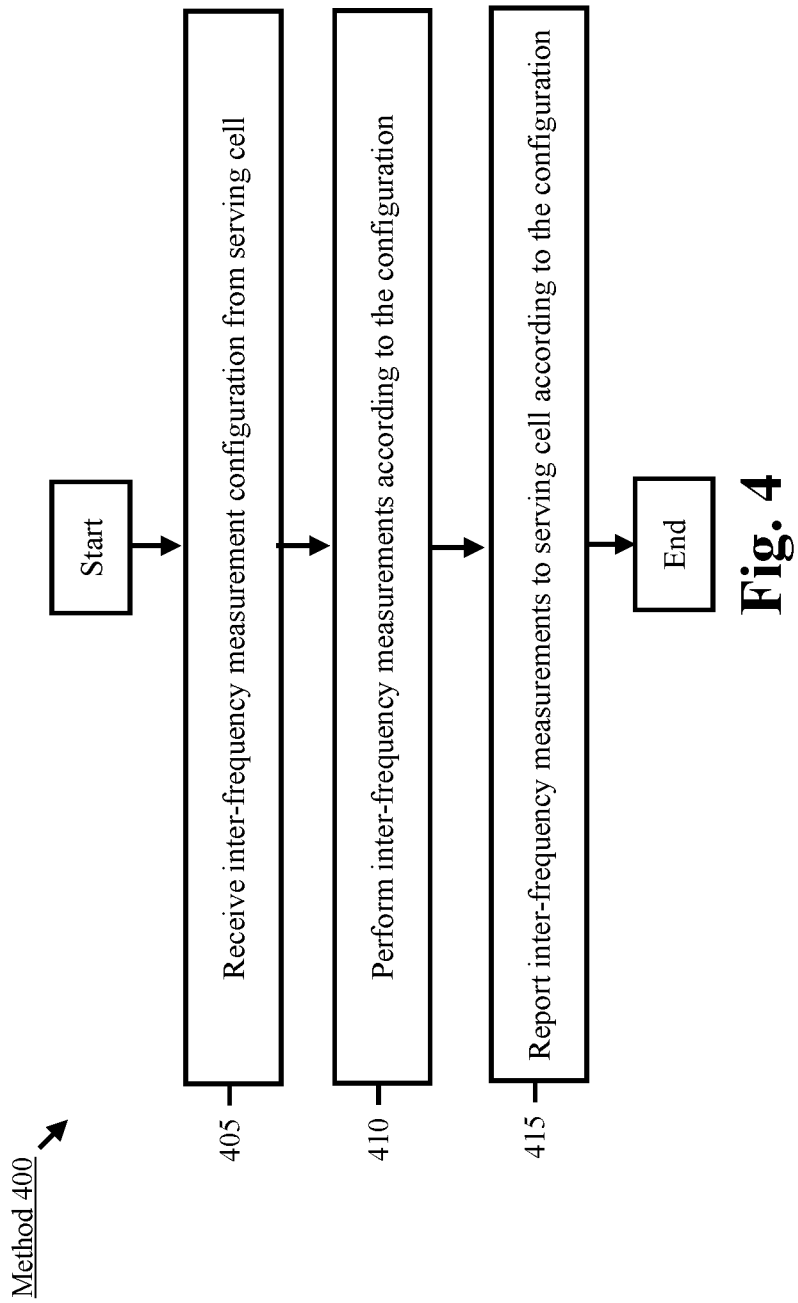

```
MeasObjectNR ::=             SEQUENCE  (
    ssbFrequency                 ARFCN-ValueNR                                                            OPTIONAL,   -- Cond
    SSBorAssociatedSSB
        ssbSubcarrierSpacing         SubcarrierSpacing                                                    OPTIONAL,   -- Cond
    SSBorAssociatedSSB
        smtc1                        SSB-MTC                                                              OPTIONAL,   -- Cond
    SSBorAssociatedSSB
        smtc2                        SSB-MTC2                                                             OPTIONAL,   -- Cond
    IntraFreqConnected
        refFreqCSI-RS                ARFCN-ValueNR                                                        OPTIONAL,   -- Cond CSI-RS
        referenceSignalConfig        ReferenceSignalConfig,
        absThreshSS-BlocksConsolidation  ThresholdNR                                                      OPTIONAL,   -- Need R
        absThreshCSI-RS-Consolidation    ThresholdNR                                                      OPTIONAL,   -- Need R
        nrofSS-BlocksToAverage       INTEGER (2..maxNrofSS-BlocksToAverage)                               OPTIONAL,   -- Need R
        nrofCSI-RS-ResourcesToAverage INTEGER (2..maxNrofCSI-RS-ResourcesToAverage)                       OPTIONAL,   -- Need R
        quantityConfigIndex          INTEGER (1..maxNrofQuantityConfig),
        offsetMO                     Q-OffsetRangeList,
        cellsToRemoveList            PCI-List                                                             OPTIONAL,   -- Need N
        cellsToAddModList            CellsToAddModList                                                    OPTIONAL,   -- Need N
        blackCellsToRemoveList       PCI-RangeIndexList                                                   OPTIONAL,   -- Need N
        blackCellsToAddModList       SEQUENCE (SIZE (1..maxNrofPCI-Ranges)) OF PCI-RangeElement           OPTIONAL,   -- Need N
        whiteCellsToRemoveList       PCI-RangeIndexList                                                   OPTIONAL,   -- Need N
        whiteCellsToAddModList       SEQUENCE (SIZE (1..maxNrofPCI-Ranges)) OF PCI-RangeElement           OPTIONAL,   -- Need N
        ...,
        [[
        freqBandIndicatorNR          FreqBandIndicatorNR                                                  OPTIONAL,   -- Need R
        measCycleSCell               ENUMERATED (sf160, sf256, sf320, sf512, sf640, sf1024, sf1280)       OPTIONAL,   -- Need R
        ]],
        [[
        smtc3list-r16                SSB-MTC3List-r16                                                     OPTIONAL,   -- Need R
        rmtc-Config-r16              SetupRelease     (RMTC-Config-r16)                                   OPTIONAL,   -- Need M
        t312-r16                     SetupRelease     ( T312-r16 )                                        OPTIONAL,   -- Need M
        ]],
        [[
        Priority                     INTEGER  (1 .. 8)                                                    OPTIONAL,   - Need M
        subPriority                  INTEGER  (1 .. 4)                                                    OPTIONAL,   - Need M
        ]]
```

Fig. 5

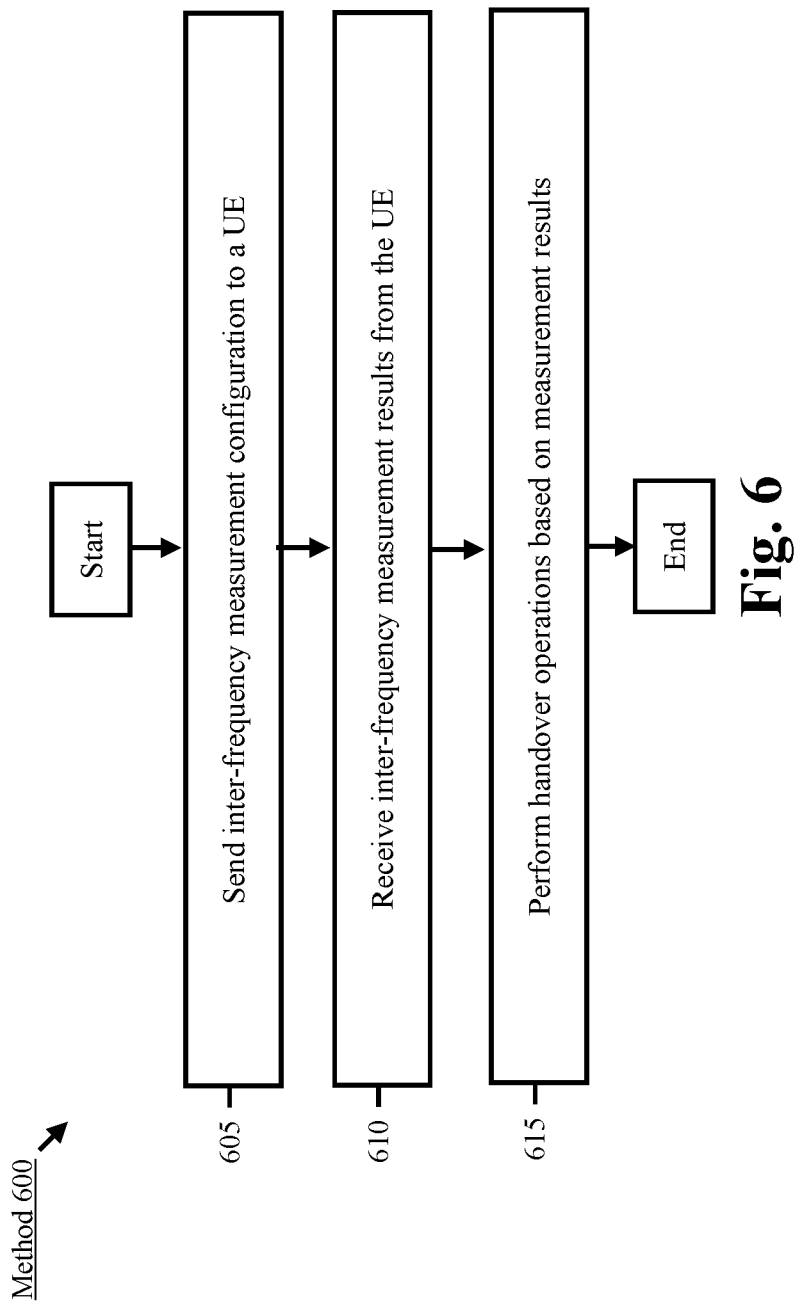

5G NEW RADIO MOBILITY ENHANCEMENTS

PRIORITY/INCORPORATION BY REFERENCE

This application claims priority to U.S. Provisional Application 63/268,413 filed on Feb. 23, 2022 and entitled, "5G New Radio Mobility Enhancements," the entirety of which is incorporated herein by reference.

BACKGROUND

An issue that arises in cellular communications is how to guarantee the best target cell for mobility, when a large number of inter-frequencies are configured by the cellular network. This issue will only grow larger due to the increasing dense deployment of New Radio (NR), in which the network operators expect to have ten (10) or more inter-frequencies configured at a time.

To provide an example of the issue, a user equipment (UE) may report mobility measurements on a first frequency (e.g., F1) to network before measuring a second frequency (e.g., F2) for mobility purposes. The network may prefer using F2 because of various network conditions (e.g., load balancing), but the network is not aware of whether the UE could detect any cells on F2. Thus, the network may trigger mobility to F1, which may not be the best cell.

This may result in a lower performance including throughput, problems with a random access channel (RACH), etc. However, immediate handover again to F2 after moving to F1 may also cause additional issues such as impacting UE power, over the air (OTA) signaling, device throughput, etc. Thus, identifying a target cell for mobility is an issue that should be addressed in cellular networks.

SUMMARY

Some exemplary embodiments are related to a processor of a user equipment (UE) configured to perform operations. The operations include receiving an inter-frequency measurement configuration comprising a plurality of frequencies, wherein neighbor cells transmit at at least one of the frequencies, the inter-frequency measurement configuration further comprising a priority associated with each of the frequencies, performing the frequency measurements of the neighbor cells according to the inter-frequency measurement configuration and reporting inter-frequency measurement results of the neighbor cells according to the priority in the inter-frequency measurement configuration.

Other exemplary embodiments are related to a processor of a base station configured to perform operations. The operations include configuring an inter-frequency measurement configuration for a user equipment (UE) comprising a plurality of frequencies to be measured, wherein neighbor cells transmit at at least one of the frequencies, the inter-frequency measurement configuration further comprising a priority associated with each of the frequencies, sending the inter-frequency measurement configuration to the UE and receiving inter-frequency measurement results for the frequency measurements of the neighbor cells according to the priority in the inter-frequency measurement configuration.

Still further exemplary embodiments are related to a method performed by a user equipment (UE). The method includes receiving an inter-frequency measurement configuration comprising a plurality of frequencies, wherein neighbor cells transmit at at least one of the frequencies, the inter-frequency measurement configuration further comprising a priority associated with each of the frequencies, performing the frequency measurements of the neighbor cells according to the inter-frequency measurement configuration and reporting inter-frequency measurement results of the neighbor cells according to the priority in the inter-frequency measurement configuration.

BRIEF DESCRIPTION OF THE DRAWINGS

FIG. 4 shows a method for inter-frequency measurements performed by a UE according to various exemplary embodiments.

FIG. 5 shows an example of a MeasObjectNR Information Element including priority information according to various exemplary embodiments.

FIG. 6 shows a method for inter-frequency measurements performed by a base station according to various exemplary embodiments.

DETAILED DESCRIPTION

Figure 1:
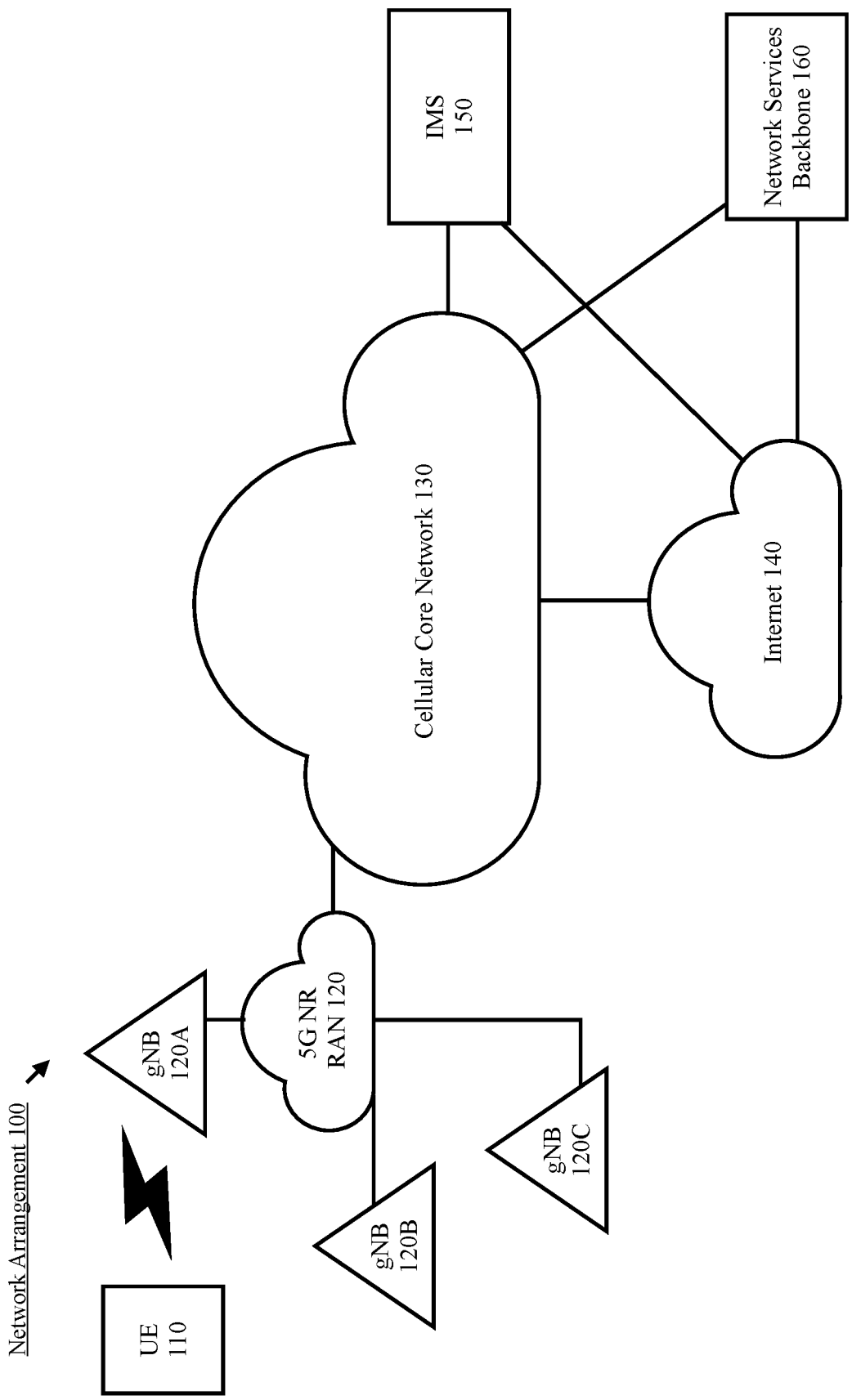
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce enhancements for fifth generation (5G) new radio (NR) mobility. As will be described in more detail below, the exemplary embodiments provide priorities for measurement objects (MOs) or measurement identifications (IDs) in dedicated connected mode configurations. While the exemplary embodiments are described with reference to 5G NR networks, the exemplary embodiments may also be applied to previous releases of the cellular standards (e.g., Long Term Evolution) or subsequent releases of the cellular standards (e.g., 6G)

The exemplary embodiments are described with regard to a user equipment (UE). However, reference to a UE is provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

Throughout this description, reference may be made to a "serving cell" and a "neighbor cell." Those skilled in the art will understand that a serving cell generally refers to a cell that is configured to transmit data to the UE. In some examples, the terms "source cell" and "serving cell" may be used interchangeably to refer to the same node. However, in some examples, the UE may be configured with multiple serving cells and each serving cell is not required to be a source cell.

Those skilled in the art will understand that a neighbor cell generally refers to a cell that is not a serving cell for the UE but located within the vicinity of the UE and/or a serving cell. In some examples, the terms "target cell" and "neighbor cell" may be used interchangeably to generally refer to the same node. However, a neighbor cell is not required to be a target cell.

In NR networks, a UE may perform mobility measurements on one or more neighbor cells and report these measurements to the network. However, the NR network may configure a large number of inter-frequencies for the UE to measure. An issue with this type of configuration is how to determine the best target cell for mobility. This issue will continue to increase due to the increasing dense deployment of NR, in which the operators expect to have 10 or more inter-frequencies configured at a time.

To provide an example deployment issue, a UE may report frequency 1 (F1) mobility measurements to network before even performing frequency 2 (F2) mobility measurements. However, the network may prefer F2 because of, for example, load balancing. In this scenario, the network may be unaware of whether the UE could detect any cells on F2 or not, and triggers mobility to F11, which may not be the preferred cell for the network.

This may lead to various drawbacks including lower performance and/or throughput, problems in Random Access Channel (RACH), immediate handover again to F2 after moving to F1 that could impact UE power, air signaling, device throughput, etc.

The exemplary embodiments introduce enhancements for 5G NR mobility. The exemplary embodiments introduce a priority for measurement objects (MOs) or Measurement IDs (Meas-IDs) in dedicated connected mode configurations. Based on the priority, the UE may first report the mobility measurements having the highest available priority to the network.

The exemplary embodiments may include the network configuring a priority (e.g., a numerical priority) for a list of MOs or Meas-IDs. The network may then assign measurement gaps, if needed, for UEs to perform inter-frequency measurements. The UE may then perform the inter-frequency measurements report the results in descending order of priority, e.g., the highest priority measurements are reported first.

In some exemplary embodiments, the UE may be configured to delay reporting a frequency with a lower priority if a higher priority frequency (Meas-ID) has a timeToTrigger (TTT) running.

In other exemplary embodiments, the measurement reporting criteria for higher priority frequencies may be relaxed, e.g., allow reporting even if serving-cell condition is not satisfied for events A5 and B2, add a serving cell specific offset that would be applicable only for higher priority measurement IDs (Ocp-hp), etc.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a wireless local area network (WLAN), etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The 5G NR RAN 120 includes a gNB 120A, a gNB 120B and a gNB 120C. In this example, it may be considered that gNB 120A is the serving cell and each of the gNBs 120B, 120C is a neighbor cell for which mobility measurements are configured for the UE 110 by the 5G NR RAN 120. Those skilled in the art will understand that each gNB may include multiple cells and a neighbor cell may be included in the same gNB, e.g., the gNB 120A may include a serving cell and a neighbor cell. However, for illustrative purposes, it may be considered in this example that gNB 120A is the serving cell, gNB 120B is a neighbor cell for which inter-frequency measurements on F1 are configured and gNB 120C is a neighbor cell for which inter-frequency measurements on F2 are configured.

Those skilled in the art will understand that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific base station, e.g., the gNB 120A, the gNB 120B, the gNB 120C.

The network arrangement 100 also includes a cellular core network 130, the Internet 140, an IP Multimedia Subsystem (IMS) 150, and a network services backbone 160. The cellular core network 130 may refer an interconnected set of components that manages the operation and traffic of the cellular network. It may include the evolved packet core (EPC) and/or the 5G core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
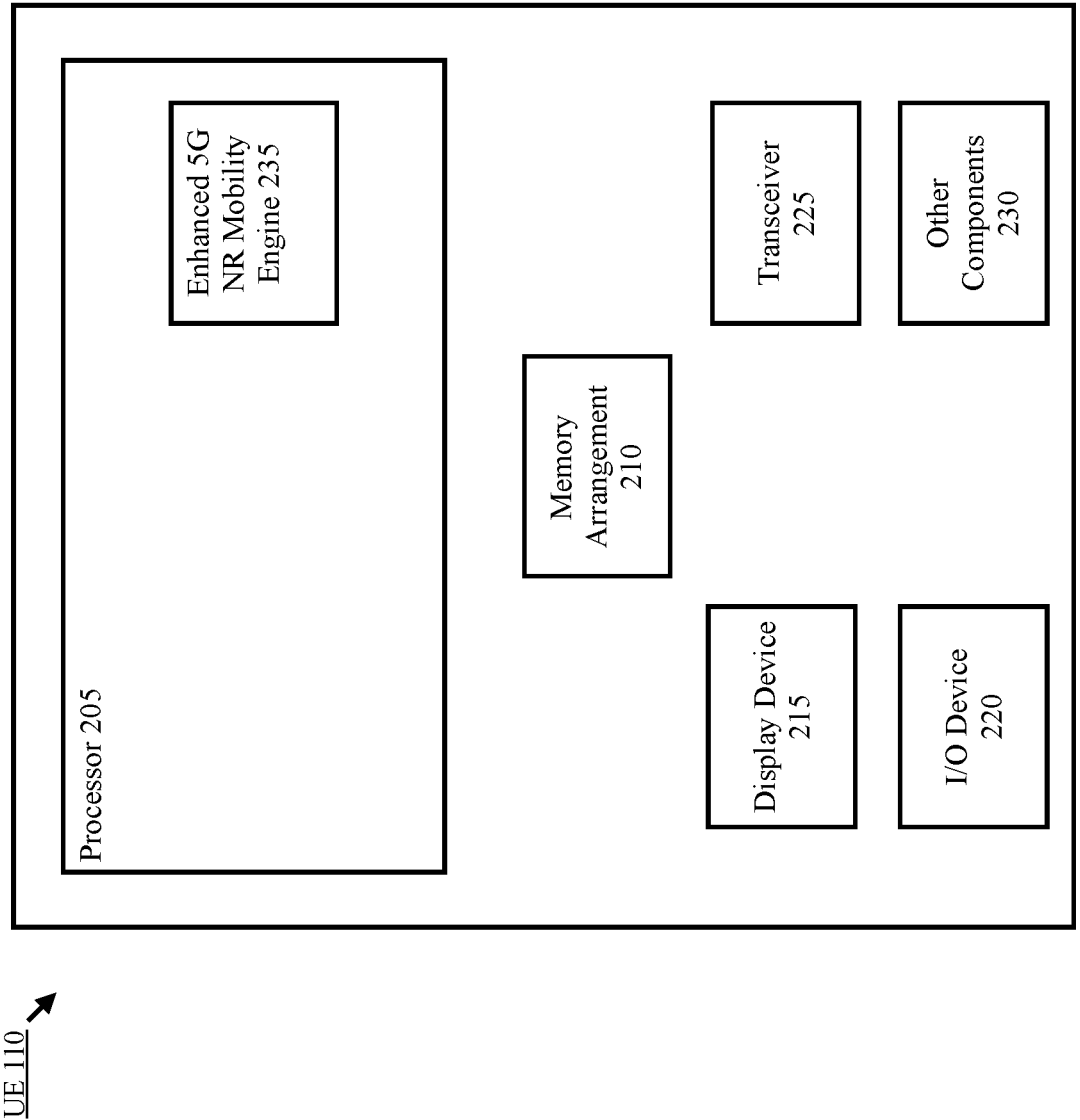
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an enhanced 5G NR mobility engine 235. The enhanced 5G NR mobility engine 235 may perform various operations related to implementing the exemplary mobility framework described herein. These operations may include, but are not limited to, receiving configuration information including the priority of MOs or Meas-IDs, performing inter-frequency measurements, and reporting measurement results to the network.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
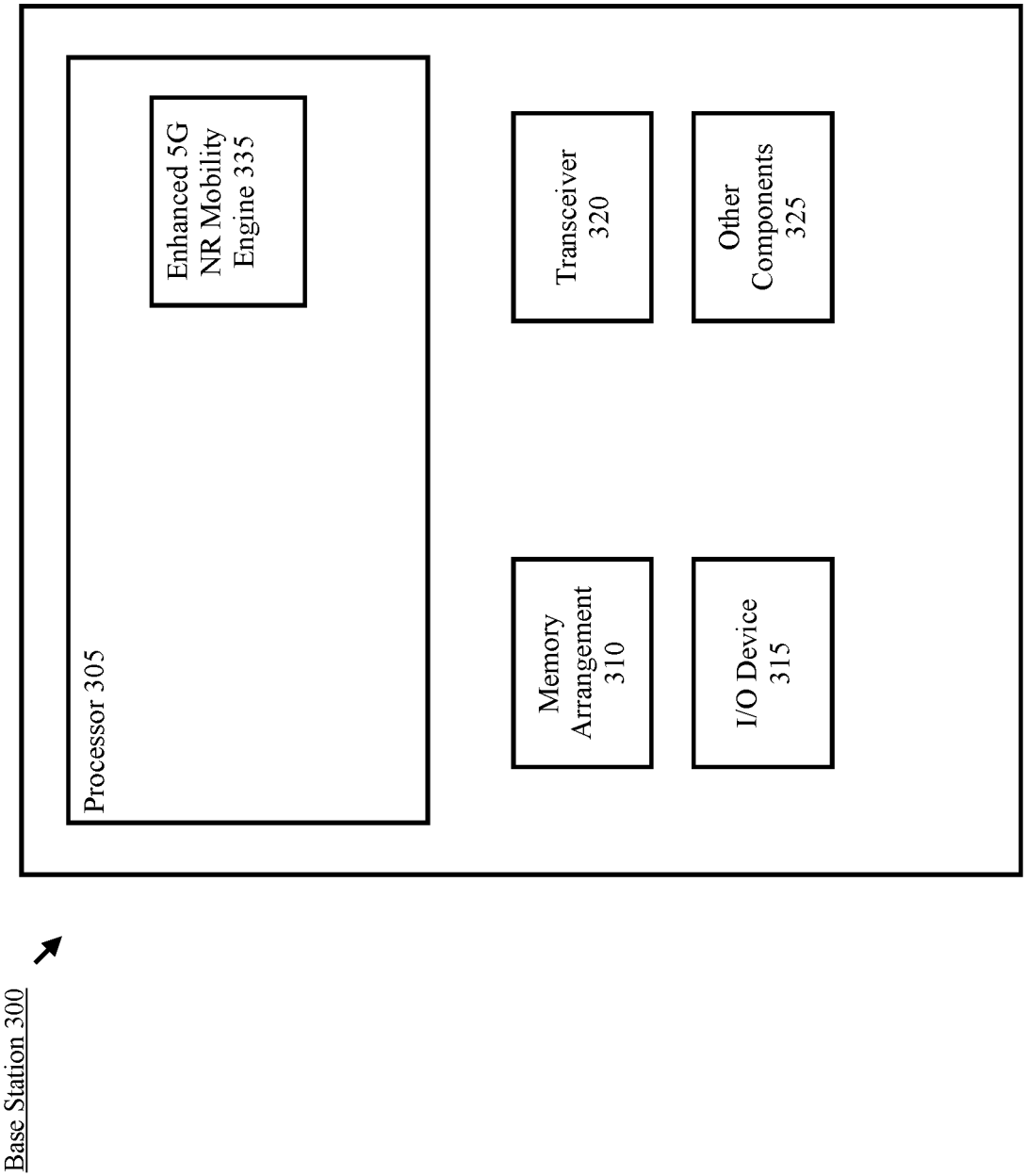
FIG. 3 shows an exemplary base station according to various exemplary embodiments.

FIG. 3 shows an exemplary base station 300 according to various exemplary embodiments. The base station 300 may represent the gNB 120A, the gNB 120B, the gNB 120C or any other access node through which the UE 110 may establish a connection and manage network operations.

The base station 300 may include a processor 305, a memory arrangement 310, an input/output (I/O) device 315, a transceiver 320, and other components 325.

The processor 305 may be configured to execute a plurality of engines for the base station 300. For example, the engines may include an enhanced 5G NR mobility engine 335. The enhanced 5G NR mobility engine 335 may perform various operations related to the exemplary mobility framework described herein. These operations may include, but are not limited to, transmitting configuration information to the UE 110 including the priority of MOs or Meas-IDs, receiving inter-frequency measurement results from the UE 110, selecting a target cell for handover operations based on the reported measurement results, etc.

The above noted engine 335 being an application (e.g., a program) executed by the processor 305 is only exemplary. The functionality associated with the engine 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs. The other components 325 may include, for example, an audio input device, an audio output device, a battery, a data acquisition device, ports to electrically connect the base station 300 to other electronic devices, etc.

FIG. 4 shows a method 400 for inter-frequency measurements performed by a UE according to various exemplary embodiments.

Initially, consider a scenario in which the UE 110 is connected to the 5G NR RAN 120 via the gNB 120A. Thus, the gNB 120A may be characterized as a serving gNB for the UE 110.

In 405, the UE 110 receives inter-frequency configuration information from the serving cell 120A. In this example, it may be considered that the inter-frequency measurement configuration information comprises the UE 110 being configured to measure the neighbor cell 120B on F1 and measure the neighbor cell 120C on F2. The inter-frequency measurement configuration information may also include an indication that F2 inter-frequency measurements have a higher priority than F1 inter-frequency measurements. It should be understood that the above described inter-frequency measurement configuration information is only exemplary and the network may configure many other permutations of the inter-frequency measurement configuration.

As described above, the priority information may be communicated to the UE 110 in a variety of MOs or Meas-IDs. Examples include, but are not limited to, information elements (IEs) defined by the 3GPP standards such as MeasObjectNR, MeasObjectEUTRA, EventTriggerConfig, CondTriggerConfig-r16 or MeasIdToAddMod. FIG. 5 shows an example of the MeasObjectNR IE 500 including the priority information 510.

As also described above, the priority information may be a numerical value. However, any other manner of signaling a priority of a respective MO or Meas-ID may also be used.

In 410, the UE 110 performs the inter-frequency measurements according to the received inter-frequency measurement configuration. As described above, the gNB 120A may configure measurement gaps, if needed, for the inter-frequency measurements. In this example, the UE 110 may perform the F1 inter-frequency measurements for the gNB 120B and the F2 inter-frequency measurements for the gNB 120C.

In 415, the UE 110 reports the inter-frequency measurement results according to the received inter-frequency measurement configuration. Thus, in this example, since the F2 measurements of gNB 120C have a higher priority than the F1 measurements of gNB 120B, the UE 110 may report the results in a priority order from highest to lowest.

In some exemplary embodiments, the UE 110 may be configured to delay reporting a frequency with a lower priority if a higher priority frequency (Meas-ID) has a timeToTrigger (TTT) running, e.g., if the higher priority F2 measurement of gNB 120C has a TTT running, the reporting of the lower priority F1 measurement of the gNB 120B may be delayed until the TTT of the higher priority F2 measurement has expired.

In other exemplary embodiments, the measurement reporting criteria for higher priority frequencies may be relaxed, e.g., allow reporting even if serving-cell condition is not satisfied for events A5 and B2, add a serving cell specific offset that would be applicable only for higher priority measurement IDs (Ocp-hp), etc.

FIG. 6 shows a method 600 for inter-frequency measurements performed by a base station according to various exemplary embodiments.

Again, consider a scenario in which the UE 110 is connected to the 5G NR RAN 120 via the gNB 120A. Thus, the gNB 120A may be characterized as a serving gNB for the UE 110. Thus, the method 600 may be considered to be performed from the standpoint of the serving cell, e.g., gNB 120A.

In 605, the gNB 120A sends inter-frequency configuration information to the UE 110. In this example, it may be considered that the inter-frequency measurement configuration information comprises the UE 110 being configured to measure the neighbor cell 120B on F1 and measure the neighbor cell 120C on F2. The inter-frequency measurement configuration information may also include an indication that F2 inter-frequency measurements have a higher priority than F1 inter-frequency measurements. As described above, the priority information may be communicated to the UE 110 in a variety of MOs or Meas-IDs. FIG. 5 shows an example of the MeasObjectNR IE 500 including the priority information 510.

In 610, the gNB 120A receives the inter-frequency measurement results from the UE 110 according to the received inter-frequency measurement configuration. Thus, in this example, since the F2 measurements of gNB 120C have a higher priority than the F1 measurements of gNB 120B, the UE 110 may report the results in a priority order from highest to lowest.

In 615, the gNB 120A may initiate handover operations, if needed, based on the measurement results. Because the UE has reported the inter-frequency measurement results in priority order, the gNB 120A may select the most preferred target cell based on the inter-frequency measurement results.

Figure 7:
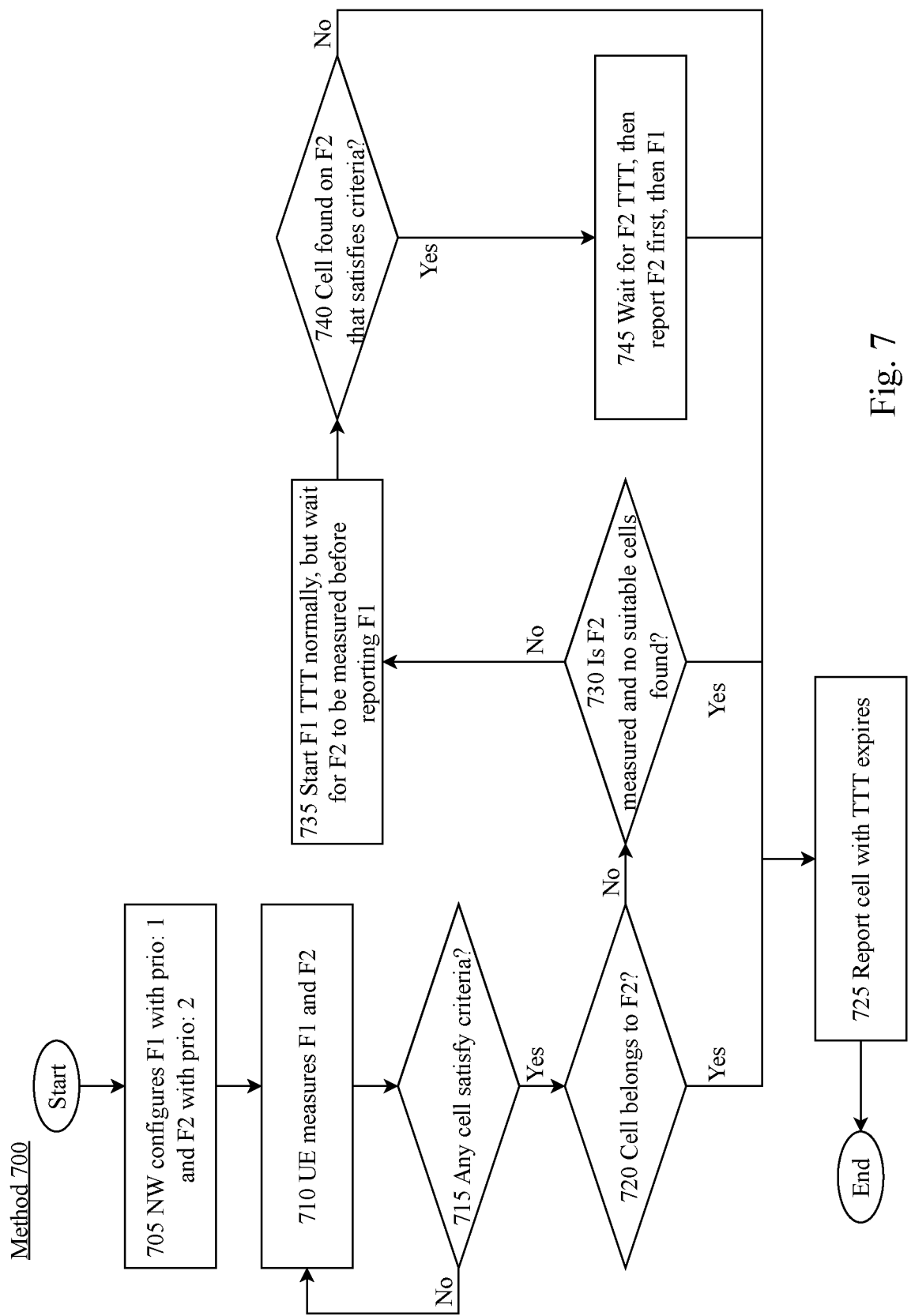
FIG. 7 shows a method for inter-frequency measurements according to various exemplary embodiments.

FIG. 7 shows a method 700 for inter-frequency measurements according to various exemplary embodiments. Again, consider a scenario in which the UE 110 is connected to the 5G NR RAN 120 via the gNB 120A. Thus, the gNB 120A may be characterized as a serving gNB for the UE 110. The gNB 120B and gNB 120C may be considered to be the neighbor cells.

In 705, the gNB 120A may configure the UE 110 to measure the neighbor cell 120B on F1 and measure the neighbor cell 120C on F2. The inter-frequency measurement configuration information may also include an indication that F2 inter-frequency measurements have a higher priority than F1 inter-frequency measurements.

In 710, the UE 110 performs the measurements according to the inter-frequency measurement configuration. In 715, the UE determines if any of the inter-frequency measurements satisfy the measurement reporting criteria. If there are no cells that satisfy the measurement reporting criteria, the method continuers back to 710 where inter-frequency measurements are continued to be made.

If at least one of the inter-frequency measurements satisfy the measurement reporting criteria, in 720, the UE 110 determines if the measurement is for a higher priority cell, e.g., gNB 120C. If yes, in 725, the UE 110 reports the inter-frequency measurement to the gNB 120A.

If the measurement is determined to be for a lower priority cell in 720, e.g., gNB 120B, in 730, the UE 110 determines if the higher priority cell has been measured and its measurement did not satisfy the measurement reporting criteria. If yes, in 725, the UE 110 reports the inter-frequency measurement of the lower priority cell to the gNB 120A.

If the higher priority measurement has not yet been made in 730, in 735, the UE 110 starts the TTT for the lower priority cell but does not report the measurement results until the higher priority measurements are performed.

In 740, after the higher priority cell has been measured, the UE determines if the higher priority cell satisfies the measurement reporting criteria. If no, the lower priority measurement is reported in 725. If yes, in 745 the higher priority TTT is started and upon expiration the higher priority measurement and the lower priority measurement are reported.

In the above described method, where the measurement reporting criteria is described, it may also be possible to use other criteria for evaluation such as conditional handover criteria or conditional PSCell change criteria.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving an inter-frequency measurement configuration comprising a plurality of frequencies,
   wherein neighbor cells transmit at at-least one of the plurality of frequencies, the inter-frequency measurement configuration further comprising a priority associated with each of the plurality of frequencies;
   performing frequency measurements of the neighbor cells according to the inter-frequency measurement configuration; and
   reporting inter-frequency measurement results of the neighbor cells according to the priority in the inter-frequency measurement configuration;
   wherein the inter-frequency measurement configuration comprises relaxing measurement reporting criteria for higher priority measurements;
   wherein the relaxing comprises reporting higher priority measurements when one of a serving cell condition is not satisfied for event A5 or a serving cell condition is not satisfied for event B2;
   wherein the relaxing comprises a serving cell specific offset for measurement reporting criteria that applies to higher priority measurements.

2. The processor of claim 1, wherein the inter-frequency measurement results are reported from highest to lowest priority.

3. The processor of claim 1, wherein the inter-frequency measurement configuration comprises a measurement object (MO) or a Measurement Identification (Meas-ID) that includes the priority.

4. The processor of claim 1, wherein the reporting comprises delaying the reporting of measurement results with a lower priority when a higher priority measurement has a timeToTrigger (TTT) running.

5. The processor of claim 4, wherein the reporting comprises reporting the higher priority measurement results when the TTT expires and then reporting the lower priority measurement results.

6. A processor of a base station configured to perform operations comprising:
   configuring an inter-frequency measurement configuration for a user equipment (UE) comprising a plurality of frequencies to be measured,
   wherein neighbor cells transmit at at-least one of the plurality of frequencies, the inter-frequency measurement configuration further comprising a priority associated with each of the plurality of frequencies;
   sending the inter-frequency measurement configuration to the UE; and
   receiving inter-frequency measurement results for frequency measurements of the neighbor cells according to the priority in the inter-frequency measurement configuration;
   wherein the inter-frequency measurement configuration comprises relaxing measurement reporting criteria for higher priority measurements;
   wherein the relaxing comprises reporting higher priority measurements when one of a serving cell condition is not satisfied for event A5 or a serving cell condition is not satisfied for event B2;
   wherein the relaxing comprises determining a serving cell specific offset for measurement reporting criteria that applies to higher priority measurements.

7. The processor of claim 6, further comprising:
   initiating a handover operation based on the inter-frequency measurement results.

8. The processor of claim 6, wherein the inter-frequency measurement results are reported from highest to lowest priority.

9. The processor of claim 6, wherein the inter-frequency measurement configuration comprises a measurement object (MO) or a Measurement Identification (Meas-ID) that includes the priority.

10. A method performed by a user equipment (UE), comprising:
    receiving an inter-frequency measurement configuration comprising a plurality of frequencies,
    wherein neighbor cells transmit at at-least one of the plurality of frequencies, the inter-frequency measurement configuration further comprising a priority associated with each of the plurality of frequencies;
    performing frequency measurements of the neighbor cells according to the inter-frequency measurement configuration; and
    reporting inter-frequency measurement results of the neighbor cells according to the priority in the inter-frequency measurement configuration;
    wherein the inter-frequency measurement configuration comprises relaxing measurement reporting criteria for higher priority measurements;
    wherein the relaxing comprises reporting higher priority measurements when one of a serving cell condition is not satisfied for event A5 or a serving cell condition is not satisfied for event B2;
    wherein the relaxing comprises a serving cell specific offset for measurement reporting criteria that applies to higher priority measurements.

11. The method of claim 10, wherein the inter-frequency measurement results are reported from highest to lowest priority.

12. The method of claim 10, wherein the inter-frequency measurement configuration comprises a measurement object (MO) or a Measurement Identification (Meas-ID) that includes the priority.

13. The method of claim 10, wherein the reporting comprises delaying the reporting of measurement results with a lower priority when a higher priority measurement has a timeToTrigger (TTT) running.

14. The method of claim 13, wherein the reporting comprises reporting the higher priority measurement results when the TTT expires and then reporting the lower priority measurement results.

* * * * *